US006770601B1

(12) United States Patent
Brookey

(10) Patent No.: US 6,770,601 B1
(45) Date of Patent: *Aug. 3, 2004

(54) APHRON-CONTAINING AQUEOUS WELL DRILLING AND SERVICING FLUIDS

(75) Inventor: Tommy F. Brookey, Edmond, OK (US)

(73) Assignee: Masi Technologies, LLC, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/246,932

(22) Filed: Feb. 9, 1999

Related U.S. Application Data

(63) Continuation-in-part of application No. 08/800,727, filed on Feb. 13, 1997, now Pat. No. 5,881,826, which is a continuation-in-part of application No. PCT/US98/02566, filed on Feb. 10, 1998.

(51) Int. Cl.$^7$ .............................................. C09K 7/02
(52) U.S. Cl. ...................... 507/102; 507/202; 507/104; 507/110; 507/113; 507/114; 507/136; 507/204; 507/213; 507/215; 507/216; 507/261; 175/72; 166/309
(58) Field of Search ................................. 507/102, 202, 507/104, 110, 113, 114, 136, 204, 213, 215, 216, 261; 175/72; 166/309

(56) References Cited

U.S. PATENT DOCUMENTS

| | | |
|---|---|---|
| 1,737,623 A | 12/1929 | Thomson |
| 1,824,221 A | 8/1931 | Mason |
| 2,043,633 A | 6/1936 | Strauch ........................ 167/58 |
| 2,224,135 A | 12/1940 | Boehm et al. .................... 92/2 |
| 2,531,427 A | 11/1950 | Hauser ........................ 260/448 |
| 2,531,812 A | 11/1950 | Hauser ......................... 252/8.5 |
| 2,713,029 A | 7/1955 | Fuller ........................... 252/8.5 |
| 2,713,030 A | 7/1955 | Brink et al. .................. 252/8.5 |
| 2,808,887 A | 10/1957 | Erwin ........................... 166/43 |
| 2,818,230 A | 12/1957 | Davis ........................... 255/1.8 |
| 2,966,506 A | 12/1960 | Jordan .......................... 260/448 |
| 2,974,134 A | 3/1961 | Pollitzer ...................... 260/209 |
| 3,065,170 A | 11/1962 | Dumbauld et al. ........... 252/8.5 |
| 3,208,524 A | 9/1965 | Horner et al. ................ 166/32 |
| 3,229,777 A | 1/1966 | Rogers et al. ................ 175/71 |
| 3,243,000 A | 3/1966 | Patton et al. ................. 175/65 |
| 3,246,696 A | 4/1966 | Fox, Jr. ......................... 166/46 |
| 3,251,768 A | 5/1966 | Walker ......................... 252/8.5 |
| 3,269,468 A | 8/1966 | Phansalkar et al. ........... 175/71 |
| 3,301,848 A | 1/1967 | Halleck ....................... 260/209 |
| 3,313,362 A | 4/1967 | Schneider .................... 175/71 |
| 3,328,295 A | 6/1967 | Lummus et al. ............. 252/8.5 |
| 3,334,052 A | 8/1967 | Kurz ............................. 252/316 |
| 3,390,723 A | 7/1968 | Hower et al. .................. 166/30 |

(List continued on next page.)

FOREIGN PATENT DOCUMENTS

| | | | |
|---|---|---|---|
| EP | WO 98/36151 | 8/1998 | ........... E21B/21/14 |

OTHER PUBLICATIONS

Roy et al., Apicit Abstract 94:5466, Abstract of Fluid/Part. Sep. J. V5N.1, pp. 31–36, (1992).*

Tom Brookey; "Micro–bubbles": New Aphron Drill–In Fluid Technique Reduces Formation Damage in Horizontal Wells; Paper SPE 39587, Presented at the 1998 SPE (Society of Petroleum Engineers) International Symposium on Formation Damage Control held in Lafayette, Louisiana on Feb. 18–19, 1998, SPE, Richardson, Texas.

Gas Research Institute; Underbalanced Drilling Manual: GRI Reference No. GRI–97/0236, pp. 1–6 to 1–8, 2–75 to 2–81, 2–96, 2–101 to 2–104, 2–119, 2–120, 2–125 to 2–127, 2–131, 2–135 to 2–139, Chicago, Illinois., (1997).

Felix Sebba; Foams and Biliquid Foams –Aphrons; 1987, Chapter 5, pp. 63–78, John Wiley & Sons Ltd., Great Britain.

Article entitled "*Treatability of Water–based Drilling Fluids Using Colloidal Gas Aphrons*," D. Roy, K.T. Valsaraj, and V.J. Amedee, Department of Civil Engineering and Chemical Engineering, Louisiana State University, Fluid/Particle Separation Journal, vol. 5, No. 1, pp. 31–36, Mar. 1992.

Article entitled "*Drill–in Fluids Improve High–angle Well Production*," Petroleum Engineer Int'l., Mar., 1995.

Article entitled "*Microbubbles: Generation and Interaction With Colloid Particles*," J.B. Melville and E. Matijevic, Institute of Colloid and Surface Science and Department of Chemistry, Clarkson College of Technology, Potsdam, NY., pp. 217–235, 1975.

Article entitled "*Separation of Organic Dyes From Wastewater by Using Colloidal Gas Aphrons*," D. Roy, K.T. Valsarlj, and S.A. Kottai, Marcel Dekker, Inc., Separation Science and Technology, 27(5), pp. 573–589, 1992.

(List continued on next page.)

*Primary Examiner*—Philip Tucker
(74) *Attorney, Agent, or Firm*—Conley Rose, P.C.

(57) ABSTRACT

The invention provides a method and fluid for drilling or servicing a well in a subterranean formation containing lost circulation zones or depleted, low pressure reservoirs. The fluid comprises an aqueous liquid having dispersed therein a viscosifier which increases the low shear rate viscosity of the fluid to at least 10,000 centipoise, an aphron-generating surfactant, and aphrons, wherein the fluid contains less than about 20% by volume of aphrons preferably generated by the turbulence and pressure drop as the fluid exits the drill bit in the vicinity of the formation. The method of drilling a wellbore in a subterranean formation comprises continuously re-circulating, while drilling, such a drilling fluid.

94 Claims, No Drawings

U.S. PATENT DOCUMENTS

| | | | |
|---|---|---|---|
| 3,393,738 A | 7/1968 | Bernard et al. | 166/29 |
| 3,509,951 A | 5/1970 | Enochs | 175/70 |
| 3,610,340 A | 10/1971 | Hutchinson et al. | 166/311 |
| 3,628,615 A | 12/1971 | Chenevert | 175/65 |
| 3,671,022 A | 6/1972 | Laird et al. | 261/29 |
| 3,728,259 A | 4/1973 | Christman | 252/8.5 C |
| 3,743,613 A | 7/1973 | Coulter et al. | 260/17.4 ST |
| 3,754,561 A | 8/1973 | Sharman et al. | 137/13 |
| 3,819,519 A | 6/1974 | Sharman et al. | 252/8.5 C |
| 3,844,361 A | 10/1974 | Jackson | 175/65 |
| 3,900,420 A | 8/1975 | Sebba | 252/307 |
| 3,953,336 A | 4/1976 | Daigle | 252/8.5 C |
| 3,986,964 A | 10/1976 | Smithey | 252/8.5 A |
| 3,988,246 A | 10/1976 | Hartfiel | 252/8.5 A |
| 3,998,742 A | 12/1976 | Walker | 252/8.5 A |
| 4,008,766 A | 2/1977 | Savins | 252/8.5 A |
| 4,013,568 A | 3/1977 | Fischer et al. | 252/8.5 C |
| 4,036,764 A | 7/1977 | Fischer et al. | 639/8.5 C |
| 4,088,583 A | 5/1978 | Pyle et al. | 252/8.5 C |
| 4,092,252 A | 5/1978 | Fischer et al. | 252/8.5 A |
| 4,105,578 A | 8/1978 | Finlayson et al. | 252/316 |
| 4,112,025 A | 9/1978 | Wilson et al. | 261/29 |
| 4,155,410 A | 5/1979 | Jackson et al. | 919/142 |
| 4,162,970 A | 7/1979 | Zlokarnik | 210/15 |
| 4,172,800 A | 10/1979 | Walker | 252/8.5 C |
| 4,172,801 A | 10/1979 | Jackson | 252/8.5 A |
| 4,217,231 A | 8/1980 | King | 252/8.55 R |
| 4,233,438 A | 11/1980 | Myers et al. | 536/1 |
| 4,247,405 A | 1/1981 | Wier | 252/8.55 D |
| 4,262,757 A | 4/1981 | Johnson, Jr. et al. | 175/67 |
| 4,269,279 A | 5/1981 | House | 175/66 |
| 4,287,086 A | 9/1981 | Finlayson et al. | 252/316 |
| 4,299,825 A | 11/1981 | Lee | 424/180 |
| 4,304,740 A | 12/1981 | Cernoch | 261/121 R |
| 4,329,448 A | 5/1982 | Cox et al. | 536/123 |
| 4,342,866 A | 8/1982 | Kang et al. | 536/119 |
| 4,378,049 A | 3/1983 | Hsu et al. | 166/295 |
| 4,387,032 A | 6/1983 | Chiesa, Jr. | 252/3 |
| 4,391,339 A | 7/1983 | Johnson, Jr. et al. | 175/393 |
| 4,417,985 A | 11/1983 | Keane | 210/707 |
| 4,422,947 A | 12/1983 | Dorsey et al. | 252/8.5 |
| 4,425,241 A | 1/1984 | Swanson | 252/8.5 |
| 4,425,461 A | 1/1984 | Turner et al. | 524/400 |
| 4,432,881 A | 2/1984 | Evani | 252/8.5 A |
| 4,442,011 A | 4/1984 | Thaler et al. | 252/8.5 M |
| 4,442,018 A | 4/1984 | Rand | 252/307 |
| 4,464,269 A | 8/1984 | Walker et al. | 252/8.55 R |
| 4,485,020 A | 11/1984 | Shay et al. | 252/8.55 D |
| 4,486,333 A | 12/1984 | Sebba | 252/307 |
| 4,499,210 A | 2/1985 | Senuma et al. | 521/91 |
| 4,503,084 A | 3/1985 | Baird et al. | 426/573 |
| 4,519,923 A | 5/1985 | Hori et al. | 252/8.5 |
| 4,549,907 A | 10/1985 | Kohn | 106/208 |
| 4,561,985 A | 12/1985 | Glass, Jr. | 252/8.5 A |
| 4,565,647 A | 1/1986 | Llenado | 252/354 |
| 4,610,729 A | 9/1986 | Keane | 134/25.1 |
| 4,614,235 A | 9/1986 | Keener et al. | 166/301 |
| 4,664,843 A | 5/1987 | Burba, III et al. | 252/315.5 |
| 4,684,479 A | 8/1987 | D'Arrigo | 252/307 |
| 4,698,148 A | 10/1987 | Keane | 208/390 |
| 4,704,200 A | 11/1987 | Keane | 208/390 |
| 4,707,281 A | 11/1987 | Miller et al. | 252/8.514 |
| 4,717,515 A | 1/1988 | Forsyth et al. | 261/122 |
| 4,740,319 A | 4/1988 | Patel et al. | 252/8.515 |
| 4,743,383 A | 5/1988 | Stewart et al. | 252/8.51 |
| 4,758,356 A | 7/1988 | Downs | 252/8.51 |
| 4,816,551 A | 3/1989 | Oehler et al. | 528/295.3 |
| 4,832,833 A | 5/1989 | Keane | 208/390 |
| 4,861,499 A | 8/1989 | Neff et al. | 252/8.551 |
| 4,876,017 A | 10/1989 | Trahan et al. | 252/8.51 |
| 4,900,457 A | 2/1990 | Clarke-Sturman et al. | 252/8.514 |
| 4,964,465 A | 10/1990 | Surles | 166/295 |
| 4,964,615 A | 10/1990 | Mueller et al. | 252/8.511 |
| 4,978,461 A | 12/1990 | Peiffer et al. | 252/8.511 |
| 5,002,672 A | 3/1991 | Hayes et al. | 252/8.513 |
| 5,003,060 A | 3/1991 | Vinot | 536/114 |
| 5,021,170 A | 6/1991 | Shumate et al. | 252/8.515 |
| 5,024,276 A | 6/1991 | Borchardt | 166/308 |
| 5,026,735 A | 6/1991 | Stern | 521/50 |
| 5,030,366 A | 7/1991 | Wilson et al. | 252/8.551 |
| 5,075,033 A | 12/1991 | Cody et al. | 252/315.2 |
| 5,086,974 A | 2/1992 | Henshaw | 239/590 |
| 5,094,778 A | 3/1992 | Burba, III et al. | 252/315.2 |
| 5,105,884 A | 4/1992 | Sydansk | 166/270 |
| 5,106,517 A | 4/1992 | Sheu et al. | 507/110 |
| 5,110,487 A | 5/1992 | Current | 252/8.554 |
| 5,127,475 A | 7/1992 | Hayes et al. | 166/301 |
| 5,129,457 A | 7/1992 | Sydansk | 166/274 |
| 5,130,028 A | 7/1992 | Cody et al. | 210/691 |
| 5,134,118 A | 7/1992 | Patel et al. | 507/121 |
| 5,141,920 A | 8/1992 | Bland et al. | 507/136 |
| 5,151,155 A | 9/1992 | Cody et al. | 162/5 |
| 5,156,765 A | 10/1992 | Smrt et al. | 252/307 |
| 5,175,278 A | 12/1992 | Peik et al. | 536/123 |
| 5,247,995 A | 9/1993 | Tjon-Joe-Pin et al. | 166/312 |
| 5,296,164 A | 3/1994 | Thach et al. | 252/307 |
| 5,310,002 A | 5/1994 | Blauch et al. | 166/307 |
| 5,314,644 A | 5/1994 | Michelsen et al. | 261/84 |
| 5,352,436 A | 10/1994 | Wheatley et al. | 424/9 |
| 5,362,713 A | 11/1994 | Westland et al. | 507/100 |
| 5,372,462 A | 12/1994 | Sydansk | 405/264 |
| 5,397,001 A | 3/1995 | Yoon et al. | 209/170 |
| 5,495,891 A | 3/1996 | Sydansk | 166/295 |
| 5,513,712 A | 5/1996 | Sydansk | 175/69 |
| 5,514,644 A | 5/1996 | Dobson | 507/111 |
| 5,529,122 A | 6/1996 | Thach | 166/281 |
| 5,565,416 A | 10/1996 | Wu | 507/103 |
| 5,566,760 A | 10/1996 | Harris | 166/308 |
| 5,567,741 A | 10/1996 | Casey et al. | 521/133 |
| 5,591,700 A | 1/1997 | Harris et al. | 507/204 |
| 5,616,541 A | 4/1997 | Dobson, Jr. et al. | 507/145 |
| 5,639,443 A | 6/1997 | Schutt et al. | 424/9.52 |
| 5,654,260 A | 8/1997 | Wu | 507/264 |
| 5,682,951 A | 11/1997 | Sydansk | 166/292 |
| 5,706,895 A | 1/1998 | Sydansk | 166/294 |
| 5,710,110 A | 1/1998 | Cooperman et al. | 507/131 |
| 5,716,910 A | 2/1998 | Totten et al. | 507/102 |
| 5,728,652 A | 3/1998 | Dobson, Jr. et al. | 507/145 |
| 5,783,118 A | 7/1998 | Kolaini | 261/37 |
| 5,804,535 A | 9/1998 | Dobson et al. | 507/111 |
| 5,821,203 A | 10/1998 | Williamson | 507/102 |
| 5,858,928 A | 1/1999 | Aubert et al. | 507/128 |
| 5,881,826 A * | 3/1999 | Brookey | 507/102 |
| 5,916,849 A | 6/1999 | House | 507/110 |
| 5,957,203 A | 9/1999 | Hutchins et al. | 166/295 |
| 5,977,030 A * | 11/1999 | House | 507/110 |
| 6,123,159 A * | 9/2000 | Brookey et al. | 507/102 |
| 6,127,319 A | 10/2000 | House | 507/110 |
| 6,148,917 A * | 11/2000 | Brookey et al. | 507/102 |
| 6,156,708 A * | 12/2000 | Brookey et al. | 507/102 |

OTHER PUBLICATIONS

SPE 39589 entitled "*Microbubbles: New Aphron Drill–in Fluid Technique Reduces Formation Damage in Horizontal Wells*," Tom Brookey, SPE, ActiSystems, Inc., Society of Petroleum Engineers, Feb. 18–19, 1998.

SPE 53984 entitled "*Lagomar's Integrated Field Laboratory for Intensive Evaluation of Technologies*," G. de Carvajal, A. Velasques, J. Graterol, F. Ramirez and M. Medina, PDVSA E&P and R. Guimerans, PDVSA Intevep, 1999.

U.S. Statutory. Invention Registration No. H837, *Pieffer et al.*, Filed Jul. 5, 1989, Published Nov. 6, 1990.

U.S. Statutory. Invention Registration No. H1000, *Patel et al.*, Filed Aug. 16, 1990, Published Dec. 3, 1991.

Article entitled *"Carbohydrate Chemistry: Monosaccharides and Their Oligomers,"* H.S. El Khadem, Academic Press, Inc., 1988.

Article entitle *"Bioactive Carbohydrates: In Chemistry, Biochemistry and Biology,"* J.F. Kennedy and C.A. White, Halsted Press: A division of John Wiley & Sons, 1983.

Article entitled *"Hidraulica Forajului,"* (Translation: YES: of pp. 444–455), Oct. 26, 1982.

* cited by examiner

US 6,770,601 B1

APHRON-CONTAINING AQUEOUS WELL DRILLING AND SERVICING FLUIDS

The patent application is a continuation-in-part application of U.S. patent application Ser. No. 08/800,727 filed Feb. 13, 1997 now U.S. Pat. No. 5,881,826, and of P.C.T. International Application No. PCT/US98/02566 filed Feb. 10, 1998, to each of which priority is claimed herein.

BACKGROUND OF THE INVENTION

Formation damage due to invasion by drilling fluids is a well-known problem. Many zones contain formation clays which hydrate when in contact with water such as the filtrate from drilling fluids. These hydrated clays tend to block the producing zones, primarily sands, so that oil and gas cannot move to the borehole and be produced.

These zones are also damaged by solids which are carried into the openings with the fluid. The movement of drilling fluids and filtrate through these openings also causes the dislodging and migration of solids in place in the formation. These solids can lodge and block movement of produced hydrocarbons.

Invasion is caused by the differential pressure of the hydrostatic column which is generally greater than the formation pressure, especially in low pressure or depleted zones. Invasion is also due to the openings in the rock and the ability of fluids to move through the rock, the porosity and permeability of the zone.

Because of this differential pressure, drillers have long used filtrate control mechanisms to control the movement of drilling fluids and filtrate into and through the formation openings. This mechanism involves adding particles to the drilling fluid which are then deposited onto the borehole wall while circulating and drilling. These particles are generally some combination of bentonite, starch, lignins, polymers, barite, and drilled solids. They are used to plug and seal the borehole due to the particle size and shape, and some control is also due to the viscosity of the filtrate when water-soluble polymers are used. Although this wallcake forms a semipermeable barrier, some filtrate moves through and into the zone both before and after the wallcake is formed.

Wallcake control, then is not complete and some filtrate water is allowed to contact the producing zone. Another disadvantage of wallcake mud is that when filtrate moves through, the solids are screened out and left in the cake. This causes the cake to become thicker and can lead to differential sticking of the drill string.

More recent technology has seen the development of Low Shear Rate Viscosity (LSRV) fluids. LSRV may be created by the addition of specialized polymers to water or brines to form a drilling fluid. These polymers have a unique ability to create extremely high viscosity at very low shear rates. These LSRV fluids have been widely used because of their carrying capacity and solids suspension ability. They have been accepted as a way to minimize cuttings bed formation in high angle and horizontal wells, and as a way to reduce barite sag in high weight muds.

Recent studies and field experience indicate that this LSRV is helpful in controlling the invasion of drilling fluids and filtrate by creating a high resistance to movement into the formation openings. Since the fluid moves at a very slow rate, viscosity becomes very high, and the drilling fluid is contained within the borehole with a very slight penetration. This has been beneficial in protecting the zones from damage as well as reducing differential sticking in these fluids.

See for example the article entitled "Drill-In Fluids Improve High Angle Well Production", Supplement to the Petroleum Engineer International, March, 1995.

Lost circulation is also a severe problem in rotary drilling. Lost circulation occurs when the differential pressure of the hydrostatic column is much greater than formation pressure. The openings in the rock are able to accept and store drilling fluid so that none is returned to surface for recirculation. The fluid is lost downhole and can become an expensive and dangerous problem. Lost circulation can lead to hole instability, stuck drill pipe, and loss of well control. At the least, it halts drilling operations and requires expensive replacement volume to be used.

In addition to the fluid volume being lost, expensive lost circulation materials (LCM) are required. These are usually fibrous, granular, or flake materials such as can fibers, wood fibers, cottonseed hulls, nut hulls, mica, cellophane, and many other materials. These LCM materials are added to the fluid system so that they may be carried into the loss zone and lodge to form a bridge on which other materials may begin to build and seal. These LCM materials themselves are damaging to the zones, and because they must be carried many times in the drilling fluid to maintain circulation, solids removal is halted and high solids mud results.

Methods of correcting lost circulation of drilling fluids by aerating the drilling fluids are set forth in U.S. Pat. No. 2,818,230 (Davis) and U.S. Pat. No. 4,155,410 (Jackson).

The use of underbalanced drilling has increased as the development of low pressure formations has acquired more importance. Horizontal drilling, in particular, has increased the need to drill across zones that are not only low pressure, but highly fractured or permeable. The exposure of numerous fractures or openings having low formation pressures has increased the problem of lost circulation and formation invasion. The necessity of down hole tools many times preclude the use of bridging materials to stop these losses. This has led to the use of underbalanced drilling techniques to control the losses and invasion of these zones. Some of these techniques include the use of air, mist, and foam drilling fluids. Problems with these fluids include hole cleaning, control of formation fluids, corrosion, and requirements for expensive, often hard to get equipment such as compressors and boosters. Such fluids are not re-circulateable and must be constantly generated as the drilling proceeds.

SUMMARY OF THE INVENTION

A new fluid technique combines the use of low shear rate viscosity generating viscosifiers with surfactants to form colloidal gas aphrons at a concentration less than about 20% by volume at atmospheric pressure in a re-circulatable aqueous well drilling and servicing fluid. The aphrons use encapsulated air available in most circulating fluids. The aphrons reduce the density of the fluid and provide a means of bridging and sealing of the formations contacted by the fluid as the bubbles expand and aggregate to fill the openings exposed while drilling. The viscosifiers strengthen the microbubble and also provide a resistance to movement within the formation so that losses of fluid are substantially reduced as the formation is being drilled. In this way, lost circulation is prevented. Any fluid which enters the formation is clean and essentially solids-free such that damage of the formation is significantly less than with solids-containing fluids.

It is an object of this invention to provide recirculatable well drilling and servicing fluids which have an enhanced low shear rate viscosity (hereinafter abbreviated to "ELSRV") containing aphrons.

It is another object of this invention to provide a method of bridging and sealing subterranean formations during well drilling and servicing operations.

These and other objects of the invention will be obvious to one skilled in the art upon reading this specification and claims.

The process can comprise, consist essentially of, or consist of the stated steps with the stated materials. The compositions can comprise, consist essentially of, or consist of the stated materials.

PREFERRED EMBODIMENTS OF THE INVENTION

In its broadest aspects, the present invention is directed to the incorporation of aphrons into aqueous well drilling and servicing fluids (hereinafter sometimes referred to as "AWDASF"), or it may be a freshly prepared AWDASF having the characteristics desired. Stable aphron-containing AWDASF are obtained by increasing the low shear rate viscosity (LSRV) of the AWDASF to at least 10,000 centipoise, preferably at least 20,000 centipoise, and most preferably to at least 40,000 centipoise. Since the stability of the aphrons is enhanced as the LSRV increases, a LSRV of several hundred thousand may be desired.

The aphrons are obtained by incorporating (1) an aphron-generating surfactant into the AWDASF and thereafter generating the aphrons in the AWDASF or (2) generating the aphrons in a liquid compatible with the ADWASF and mixing the aphron-containing fluid with the AWDASF.

The book by Felix Sebba entitled "Foams and Biliquid Foams—Aphrons", John Wiley & Sons, 1987, incorporated herein by reference, is an excellent source on the preparation and properties of aphrons, i.e., microbubbles. An aphron is made up of a core which is often spherical of an internal phase, usually gas, encapsulated in a thin shell. This shell contains surfactant molecules so positioned that they produce an effective barrier against coalescence with adjacent aphrons.

The aphrons when first generated contain a wide size distribution ranging up to about 200 $\mu$m in diameter. At atmospheric pressure, the aphrons of very small diameter diminish very rapidly leaving aphrons in the 25 $\mu$m to about 200 $\mu$m size range. This is due to the excess pressure within the aphrons which increases as the diameter of the aphrons decreases. Thus the smaller aphrons will tend to diminish in size by transferring their gas to the larger ones which would have a lower excess pressure.

In the case of the aphron-containing well drilling and servicing fluids of the present invention, the aphrons are preferably generated downhole as the fluid exits the drilling bit. The fluid is under considerable pressure composed of hydrostatic as well as pressure loss created by the circulating system. It is believed that this fluid pressure compensates for the excess pressure within the aphrons such that the aphrons smaller than about 25 $\mu$m are stabilized for a period of time until they are circulated up the borehole. The aphrons thus are able to penetrate within the pore spaces of the exposed formation where they can expand and aggregate, because of the lower pore pressure within the formation, and seal the pore spaces from the entry of any fluid. Microfractures and the like will be filed with aphrons which likewise expand and aggregate within the formation to seal the microfractures.

Increases in vapor pressure due to pressure drops, temperature increases, and cavitation are common in downhole conditions. Certain solvents which may be present in the fluid may also effect vapor pressure to provide gasses needed to form aphrons.

Aphrons large enough to be seen without magnification can be visually observed in the fluid as it flows from the borehole into the surface holding tanks ("pits") before being recirculated. Generally the fluid flows across a screen to remove the drill cuttings. Screens as fine as 200 mesh (74 $\mu$m screen openings) can be used with the fluids of the present invention. Aphrons greater than the screen size will be removed from the fluid. If desired, the particle size of the aphrons in the fluid can be determined with various particle size analyzers which are commercially available. See for example the following articles: (1) "Microbubbles: Generation and Interaction with Colloid Particles", James B. Melville and Egon Matijevic, Chapter 14 in "Foams", R. J. Akers, editor, Academic Press, 1976; (2) "Separation of Organic Dyes from Wastewater by Using Colloidal Gas Aphrons", D. Roy, K. T. Valsaraj, and S. A. Kottai, Separation Science and Technology, 27(5), pp. 573–588 (1992). These articles are incorporated herein by reference.

Upon being recirculated down the drill string and through the bit additional aphrons are generated provided the concentration of the surfactant is sufficient. It is desirable to add additional surfactant to the fluid either continuously or intermittently until the desired quantity of aphrons is produced.

The aphrons can be generated by means known in the art. In addition to the methods disclosed by Felix Sebba in his book referenced previously, methods are disclosed in Michelsen et al. U.S. Pat. No. 5,314,644, incorporated herein by reference, Yoon et al. U.S. Pat. No. 5,397,001, incorporated herein by reference, Kolaini U.S. Pat. No. 5,783,118, incorporated hereby by reference, Wheatley et al. U.S. Pat. No. 5,352,436, incorporated herein by reference, and U.S. Pat. Nos. 4,162,970; 4,112,025; 4,717,515; 4,304,740; and 3,671,022, each incorporated herein by reference. The AWDASF can then be continuously circulated in the hole. It should be noted that common drilling fluids having lower LSRV containing entrained air can cause severe pump problems. Properly formulated into aphrons and an elevated LSRV, as in the present invention, these fluids can be pumped readily.

If necessary, air or other gas can be incorporated into the fluid to entrain more gas for forming aphrons. The gas used may be any gas which is not appreciably soluble in the liquid phase of the fluid. Thus the gas may be air, nitrogen, carbon dioxide, organic gases, and the like, including air encapsulated in the fluid during mixing.

The quantity of aphrons in the fluid depends on the density required. Generally, the fluid will contain less than about 20% by volume aphrons, preferably less than about 15% by volume of aphrons. Thus the density of the circulating fluid can be monitored on the surface and additional surfactant added as necessary to maintain the desired density, if the density is too high, and weight material may be added if the density is too low. The quantity of aphrons in the fluid can be determined by destroying or lowering the LSRV of the fluid thus destabilizing the surfactant-containing shells surrounding the aphrons. Measurement of the change in volume of the fluid will indicate the volume % of aphrons in the fluid. Preferably the quantity of aphrons in the fluid is determined by comparing the density of the fluid at atmospheric pressure with the density of the fluid under elevated pressures, such as measured with a pressurized mud balance.

The AWDASF comprises an aqueous liquid having incorporated therein a viscosifier such that the AWDASF has a LSRV of at least 10,000 centipoise, preferably at least 20,000 centipoise, and most preferably at least about 40,000 centipoise, an aphron generating surfactant, and aphrons, and optionally, a release agent. Any viscosifier which enhances the viscosity of the liquid phase surrounding the aphrons will enhance their stability; however, we have found that those viscosifiers which provide the elevated LSRV required of the present invention have the unique property of delaying coalescence of the aphrons for extremely long period of time.

None of the known prior art disclose the use of aphrons (or microbubbles) in systems under elevated pressures as in the present use. It is well known that the hydrostatic pressure of the fluid in a borehole increases as the depth increases. Thus although the size of the microbubbles is compressed, the elevated LSRV is believed to keep the aphrons from coalescing. In this regard, the aphrons can have a larger size at the surface of the well, as long as they are individual bubbles, since they will decrease in size to the aphron size range of less than about 100 micrometers as they are pumped down the borehole.

The base aqueous liquid may be fresh water, sea water, or a brine containing soluble salts such as sodium chloride, potassium chloride, calcium chloride, magnesium chloride, sodium bromide, potassium bromide, calcium bromide, zinc bromide, sodium formate, potassium formate, cesium formate, and mixtures thereof. The brine may contain one or more soluble salts at any desired concentration up to saturation. Indeed, super saturated brines can be utilized where a solids free fluid is not desired or required.

Means are known in the art to enhance the low shear rate viscosity of liquids. Thus aqueous systems can be viscosified with certain polymers which produce a fluid exhibiting a high yield stress, shear thinning behavior. Particularly useful are biopolymers produced by the action of bacteria, fungi, or other microorganisms on a suitable substrate. Exemplary biopolymers are the polysaccharides produced by the action of Xanthomonas compestris bacteria which are known as xanthan gums. These are available commercially from several sources including: Kelco Oil Field Group, Inc., under the trademarks "Xanvis" and "Kelzan"; Rhone-Poulenc Chimie Fine, under the trademark "Rhodopol 23-p"; Pfizer Inc., under the trademark "Flocon 4800C"; Shell International Chemical Company of London, U.K., under the trademark "Shellflo ZA"; and Drilling Specialties Company, under the trademark "Flowzan." See for example U.S. Pat. No. 4,299,825 and U.S. Pat. No. 4,758,356, each incorporated herein by reference. Other biopolymers useful in the fluids of this invention are the so-called welan gums produced by fermentation with a microorganism of the genus Alcaligenes. See for example U.S. Pat. No. 4,342,866, incorporated herein by reference. Gellan gums are disclosed in U.S. Pat. No. 4,503,084, incorporated herein by reference. Schleroglucan polysaccharides produced by fungi of the genus sclerotium are disclosed in U.S. Pat. No. 3,301,848, incorporated herein by reference. Commercially available schleroglucan is sold under the trademarks "Polytran" from the Pillsbury Company and "Actigum CS-11" from CECA S. A. Succinoglycan polysaccharides are produced by cultivating a slime-forming species of Pseudomonas, Rhizobium, Alcaligenes or Agrobacterium, e.g., Pseudomonas sp. NCIB 11264, Pseudomonas sp. NCIB 11592 or Agrobacterium radiobacter NCIB 11883, or mutants thereof, as described in European Patent No. A40445 or A138255. Commercially available succinoglycan biopolymer is sold by Shell International Chemical Company of London, U.K., under the trademark "Shellflo-S".

Other water soluble polymers which impart shear thinning rheology to aqueous fluids include alginic acid derivatives, such as hydroxypropyl alginate, sodium alginate, sodium calcium alginate, ammonium calcium alginate, ammonium alginate, potassium alginate, propyleneglycol alginate, and the like. In-situ crosslinking of sodium alginate solutions with a divalent cation, such as with a calcium salt, produces elevated low shear rate viscosities.

Miller et al. U.S. Pat. No. 4,707,281, incorporated herein by reference, discloses that an additive comprising high pyruvic xanthan containing about 5 to 9 percent by weight pyruvic acid and locust bean gum, wherein the weight ratio of the high pyruvate xanthan to locust bean gum is from about 40:60 to 80:20, increases the LSRV of aqueous drilling and completion fluids.

Daigle U.S. Pat. No. 3,953,336 discloses that shear thinning drilling fluids having enhanced LSRV are prepared from an aqueous liquid, a polysaccharide such as xanthan gum, and a cellulose derivative, such as hydroxyethylcellulose (HEC), carboxymethylcellulose (CMC), or hydroxpropylcellulose (HPC), wherein the weight ratio of xanthan gum to cellulose derivative, preferably HEC, is from 80:20 to 20:80.

The minimum concentration of the polymer required to increase the low shear rate viscosity of the fluid can be determined by routine testing. Thus the minimum concentration will be an amount sufficient to impart to the fluid the desired low shear rate viscosity. Generally the fluids will contain a concentration from about 1.4 kg/m$^3$ (0.5 ppb) to about 28.5 kg/m$^3$ (10 ppb), preferably from about 2.85 kg/m$^3$ (1.0 ppb) to about 14.3 kg/m$^3$ (5.0 ppb).

Patel et al. U.S. Pat. No. 5,134,118, incorporated herein by reference, discloses a polymer for increasing the LSRV of aqueous drilling fluids comprising a mixture of (1) a water soluble polymer being the reaction product of (i) 25–75% by weight of 2-acrylamido-2-methyl-propane sulfonic acid, (ii) 0.5–50% by weight N,N-dimethylacrylamide; (iii) up to 60% by weight acrylamide; (iv) up to 25% by weight styrene sulfonic acid; and (2) a gelling agent selected from the group consisting of partially hydrolyzed polyacrylamide, biopolymers, bentonite, attapulgite, and combinations thereof.

Neff et al. U.S. Pat. No. 4,861,499, incorporated herein by reference, discloses increasing the low shear viscosity of an aqueous liquid by dispersing therein a water-soluble composition consisting essentially of (1) a water soluble terpolymer of (a) acrylamide; (b) 2-acrylamido-2-methylpropane sulfonic acid salt, acrylic acid, or dimethylaminoethyl acrylate metal chloride salt; and (c) a $C_8$–$C_{20}$ alkyl ester of acrylic acid; and (2) a water soluble inorganic salt.

Certain aqueous liquids can be viscosified with a combination of a dispersed smectite clay, such as sodium bentonite, and a mixed metal hydroxide as set forth in U.S. Pat. Nos. 4,664,843 and 5,094,778, both incorporated herein by reference. Indeed aqueous fluids can be obtained having an elevated LSRV by appropriately flocculating aqueous bentonitic clay dispersions or by incorporating 25 ppb or more non-beneficiated sodium bentonite therein.

Glass, Jr. U.S. Pat. No. 4,561,985, incorporated herein by reference, discloses bentonite-containing drilling fluids containing an additive to beneficiate the bentonite, the additive comprising (1) a nonionic, water-soluble polysaccharide selected from the group consisting of (i) a non-ionic, water-soluble cellulosic derivative, (ii) a non-ionic water-soluble guar derivative; or (2) an anionic water-soluble polysaccharide selected from the group consisting of (1) a carboxymethyl cellulose or (ii) Xanthomonas campestris polysaccharide; or (3) a combination thereof; and (4) an intermediate molecular weight polyglycol, selected from the group consisting of polyethylene glycol, polypropylene glycol, and poly-(alkanediol), having an average molecular weight of from about 600 to about 30,000, said polyglycol being used in an amount effective to provide compatibility in the drilling fluid between the clay and the polysaccharide. The bentonite/additive combination provides aqueous base drilling fluids having elevated low shear rate viscosities which are shear thinning.

The aphron-generating surfactant for use in the spoffing fluids of this invention must be compatible with the base liquid and the viscosifier therein such that the LSRV of the fluid can be maintained. The surfactant may also have one or more stabilizers incorporated therein, such as alkyl alcohols, fatty alkanolamides, and alkyl betaines. Generally the alkyl chain will contain from about 10 to about 18 carbon atoms. The aphron-generating surfactant may be anionic, non-ionic, or cationic depending on compatibility with the viscosifier. The annual publication "McCutcheon's Emulsifiers & Detergents", MC Publishing Co., McCutcheon Division, lists many surfactants and their manufacturers. Preferred anionic foaming surfactants are alkyl sulfates, alpha olefin sulfonates, alkyl (alcohol) ether sulfates, refined petroleum sulfonates, and mixtures thereof Typically these surfactants will contain an alkyl chain having 8 to about 18 carbon atoms, preferably about 12 to about 16 carbon atoms. Preferred non-ionic surfactants are ethoxylated alcohols and amine oxides having an alkyl chain length of about 10 to about 18 carbon atoms, preferably from about 12 to about 16 carbon atoms. Fluorocarbon based surfactants are preferred for systems in which the oleaginous liquid is the continuous phase.

Representative commercially available surfactants are: (1) alkyl sulfates—DUPONOL™ Brand, Witco Corp; RHODAPON™ Brand, Rhone-Poulenc; STEOL™ Brand, Stepan Co.; (2) alpha olefin sulfonates—WITCONATE™ AOS and 3203, Witco Corp.; STEPANTAN™ AS-40, Stepan Co.; RHODACAL™ A-246/6, Rhone-Poulenc; (3) alkyl ether sulfates—WITCOLATE™ Brand, Witco Corp.; RHODAPLEX™ Brand, Rhone-Poulenc; SULFOCHEM™ Brand, Chemron Corp; (4) petroleum sulfonates—BASE™ Brand, Keil Chemical; MONALUBE™ 605, Mona Industries Inc.; WITCONATE™ NAS-8, Witco Corp.; (5) ethoxylated alcohols—ALFONIC™ Brand, Vista Chemical Co.; SURFONIC™ Brand, Huntsman Corp.; NEODOL™ Brand, Shell Chemical Co.; (6) amine oxides— AMMONYX™ Brand, Stepan Co.; RHODAMOX™ Brand, Rhone-Poulenc; CHEMOXIDE™ Brand, Chemron Corp; (7) betaines—CHEMBETAINE™ Brand, Chemron Corp.; REWOTERIC™ Brand, Witco Corp.; MIRATAINE™ Brand, Rhone-Pouienc; (8) fluorocarbon-based surfactants—FLUORAD™ Brand, 3M Co.; ZONYL™ Brand, E. I. Dupont De Nemours & Co.; (9) fatty alkanolamides—ALKAMIDE™ Brand, Rhone-Poulenc; AMIDEX™ Brand, Chemron Corp; WITCAMIDE™ Brand, Witco Corp.

There is disclosed in Schutt et al. U.S. Pat. No. 5,639,443, incorporated herein by reference, that suitable surfactants for forming ricrobubbles include block copolymers of polyoxypropylene polyoxyethylene, sugar esters, fatty alcohols, aliphatic amine oxides, hyaluronic acid aliphatic esters, hyaluronic acid aliphatic ester salts, dodecyl poly (ethyleneoxy)ethanol, nonylphenoxy poly(ethyleneoxy) ethanol, hydroxy ethyl starch, hydroxyethyl starch fatty acid esters, dextrans, dextran fatty acid esters, sorbitol, sorbitol fatty acid esters, gelatin, serum albumins, phospholipids, polyoxyethylene fatty acid esters such as polyoxyethylene stearates, polyoxyethylene fatty alcohol ethers, polyoxyethylated sorbitan fatty acid esters, glycerol polyethylene glycol oxystearate, glycerol polyethylene glycol ricinolate, ethoxylated soybean sterols, ethoxylated castor oils and the hydrogenated derivatives thereof, cholesterol, fatty acids having 12 to 24 carbon atoms or salt thereof, and surfactants that form ordered structures in solution and produce non-Newtonian viscoelastic surface tensions such as sugar based surfactants and protein or glycoprotein surfactants. One preferred type of such surfactant has a sugar or other carbohydrate head group, and a hydrocarbon or fluorocarbon tail group. A large number of sugars are known that can function as head groups, including glucose, sucrose, mannose, lactose, fructose, dextrose, aldose, and the like. The tail group preferably has from 2 to 24 carbon atoms, preferably a fatty acid group (branched or unbranched, saturated or unsaturated) covalently bound to the sugar moiety through an ester bond. A preferred surfactant mixture includes a nonionic surfactant or other surfactant in combination with one or more of the non-Newtonian viscoelastic surfactants.

There is disclosed in Wheatley et al. U.S. Pat. No. 5,352,436, incorporated herein by reference, that suitable surfactants for forming stabilized gas microbubbles comprise a first soluble surfactant and a second dispersible surfactant. Suitable first surfactants include polyoxyethylene fatty acid esters such as polyoxyethylene sorbitan monolaurate, polyoxyethylene sorbitan monostearate, polyoxyethylene sorbitan tristearate, polyoxyethylene sorbitan monooleate, and mixtures thereof. Suitable second surfactants, which are different from the first surfactant, include sorbitan monostearate, sorbitan monooleate, and mixtures thereof.

D'Arrigo U.S. Pat. No. 4,684,479, incorporated herein by reference, discloses surfactant mixtures comprising (a) a member selected from the group consisting of glycerol monoesters of saturated carboxylic acids containing from about 10 to about 18 carbon atoms and aliphatic alcohols containing from about 10 to about 18 carbon atoms; (b) a sterol-aromatic acid ester; (c) a member selected from the group consisting of sterols, terpenes, bile acids and alkali metal salts of bile acids; (d) a member selected from the group consisting of sterol esters of aliphatic acids containing from 1 to about 18 carbon atoms; sterol esters of sugar acids; esters of sugar acids and aliphatic alcohols containing from about 10 to about 18 carbon atoms; esters of sugars and aliphatic acids containing from about 10 to about 18 carbon atoms; sugar acids; saponins; and sapogenins; and (e) a member selected from the group consisting of glycerol, glycerol di- or triesters of aliphatic acids containing from about 10 to about 18 carbon atoms and aliphatic alcohols containing from about 10 to about 18 carbon atoms; said components being present in said mixture in a weight ratio a:b:c:d:e of 2–4:0.5–1.5:0.5–1.5:0–1.5:0–1.5.

The fluorosurfactants include, but are not limited to, (i) fluorinated telomers, (ii) amphoteric fluorosufactants, (iii) polyfluorinated amine oxide, (iv) fluoroalkyl ethylthio polyacrylamides, (v) perfluoroalkyl ethylthiopolyacrylamides, (vi) derivatives of 1-propanaminium, 2-Hydroxy-N,N,N-trimethyl-3-gamma-omega-perfluoro-($C_6$–$C_{20}$-alkyl) thio, chloride, (vii) fluoroalkyl sodium sulfonate, and (viii) sodium salts of 1-propanesulfonic acid, 2-methyl-, 2-{[1-oxo-3[gamma, -omega, -perfluoro-$C_{16}$–$C_{26}$-alkyl) thio} propyl} amino} derivative.

The concentration of aphron-generating surfactant required is generally less than the critical micelle concentration (CMC) of the surfactant or surfactant mixture. An indication of the volume of aphrons generated can be obtained by determining the density reduction which occurs upon generating the aphrons in the fluid. Foaming of the fluid, which is undesirable, can occur if the concentration of aphron-generating surfactant is excessive. We have determined that the concentration of surfactant can be increased, without any adverse effect on the fluid, as the LSRV increases. Thus the concentration of aphron-generating surfactant, which can be determined by routine testing, is the amount required to generate sufficient aphrons to give the density reduction desired but which is, preferably, insufficient to create a long-lasting foam on the surface of the fluid. Generally, a concentration of the surfactant from about 0.15% by volume to about 2% by volume is required, preferably from about 0.3% to about 1.0% by volume, assuming the surfactant contains about 80% by weight solids.

The density of the fluids can be adjusted, as required, by the addition of weight materials or the addition of soluble salts to the fluids as is well known in the art. Preferably the weight material is added to the fluid before generation or incorporation of aphrons therein, thus adjusting the final density of the aphron-containing spotting fluid to the desired density by the concentration of aphrons therein.

As indicated, the concentration of aphrons in the fluid should be less than about 20% by volume at atmospheric pressure. However, on circulation of the fluid in a borehole, the volume of the aphrons is believed to decrease as the hydrostatic pressure of the fluid increases. Indeed the aphrons may compress in size to almost no volume depending on the depth of the borehole. The measured density under pressure should be very close to the density of the fluid without any aphrons. The aphrons do not disappear, however. They are still present, and additional aphrons will be generated at the face of the bit due to the pressure drop and cavitation. The aphrons are extremely small, have very high surface area, and are highly energized.

As soon as the fluid exits the bit and starts back up the annulus, some pressure drop begins to occur and the aphrons will begin to expand. As the fluid moves up the borehole and it encounters a loss to the formation, the aphrons are filtered into the pore throats, microfractures, or other types of loss zone. These loss zones are areas where pressure drops occur. The aphrons in these loss zones then expand and aggregate and hence seal the loss zones. The "% aphrons by volume" in these micro environments is highly variable and will depend on the specific pressure and pressure drop within the loss zones. Thus it is believed that the micro environment density is completely different than the density of the fluid in the borehole.

The density reduction at atmospheric pressure which occurs on entraining up to 20% by volume of a gas in the fluids of the invention is sufficient to provide the quantity of aphrons needed in the borehole while allowing the fluid to be recirculatable without causing pump problems.

The water base borehole fluids of this invention generally may contain materials well known in the art to provide various characteristics or properties to the fluid. Thus the fluids may contain one or more viscosifiers or suspending agents in addition to the viscosifiers which enhance the LSRV, weighting agents, corrosion inhibitors, soluble salts, biocides, fingicides, seepage loss control additives, bridging agents, lubricity additives, shale control additives, and other additives as desired.

The borehole fluids may contain one or more materials which function as encapsulating or fluid loss control additives to further restrict the entry of liquid from the fluid to the contacted shale. Representative materials known in the art include partially solubilized starch, gelatinized starch, starch derivatives, cellulose derivatives, gums, synthetic water soluble polymers, and mixtures thereof.

The fluids of this invention should have a basic pH. The pH can be obtained as is well known in the art by the addition of bases to the fluid, such as potassium hydroxide, potassium carbonate, sodium hydroxide, sodium carbonate, magnesium hydroxide, magnesium oxide, calcium oxide, alcium hydroxide, zinc oxide, and mixtures thereof.

Without being limited hereby, it is believed that the aphrons present in the fluid effectively seal the formation during drilling or well servicing operations thus preventing the excessive loss of fluid to the formations being drilled or serviced.

The fluids of this invention can be used in conventional drilling and well servicing operations as conducted in the art. Thus in drilling an oil and/or gas well the fluid is circulated from the surface down the drill pipe, coiled tubing, or the like through the bit and up the annulus between the drill pipe and the sides of the borehole back to the surface. The aphrons in the fluid seal the borehole surface preventing the loss of excessive amounts of fluid to the formations being drilled.

It is preferred that the aphron-containing fluid of the present invention be utilized in a drilling process wherein the drill bit is a cavitating liquid jet assisted drill bit. Exemplary cavitating liquid jet assisted drill bits are set forth in Johnson, Jr. et al. U.S. Pat. No. 4,262,757, incorporated herein by reference, and Johnson, Jr. et al. U.S. Pat. No. 4,391,339, incorporated herein by reference. Preferably the cavitating jet nozzle in the cavitating liquid jet assisted drill bit includes a pin received at a central position which lowers the pressure of the pressurized drilling fluid such that cavitation bubbles form in the fluid. See for example Henshaw U.S. U.S. Pat. No. 5,217,163, incorporated herein by reference.

Similarly, the fluids of the invention can be in well servicing operations such as completion operations, workover operations, sand control operations, frac pack operations, and the like. The fluids can be used as spotting fluids to release pipes and tools stuck in the filter cake on the sides of a borehole by differential sticking.

Moreover, the aqueous base aphron-containing well drilling and servicing fluids set forth in co-pending U.S. patent applications Ser. No. 08/800,727 filed Feb. 13, 1997 now U.S. Pat. No. 5,881,826 and Ser. No. 09/121,713 filed Jul. 24, 1998 pending, as well as co-pending PCT patent application PCT/US98/02566 filed Feb. 10, 1998, can also be used in well servicing operations such as completion operations, workover operations, sand control operations, frac pack operations, and the like, including use of the fluids as spotting fluids to release pipes and tools stuck in the filter cake on the sides of a borehole by differential sticking.

The following examples are presented to demonstrate the invention but should not be construed as limiting the scope of the invention. The aphron-generating surfactants evaluated are as follows: STEOL™ CS-460, sodium laureth sulfate which is 60% active; and FLUORAD™ FC-740, a mixture of fluorinated aliphatic polymeric esters. Abbreviations used in the table or this specification are as follows: cp=centipoise; g=grains; bbl=42 gallon barrel; ppg=pounds per gallon; ppb=pounds per barrel; psi=pounds per square inch; rpm=revolutions per minute; STI=shear thinning index which is the ratio of the 0.5 rpm Brookfield viscosity and the 100 rpm Brookfield viscosity, a measure of the degree of shear thinning of a fluid; vol.=volume; LSRV=low shear rate viscosity measured on a Brookfield Viscometer at 0.5 rpm.

EXAMPLE 1

A fluid as set forth in Glass, Jr. U.S. Pat. No. 4,561,985 was prepared containing 1.0 ppb HEC-10™ hydroxyethylcellulose, 1.0 ppb XCD™ xanthan gum, 0.2 ppb caustic soda, 1.0 ppb POLYGLYCOL™ E8000 polyethyleneglycol, MW of 8000, and 15 ppb Wyoming bentonite. 1.0 ppb of BLUE STREAK aphron-generating surfactant was added while mixing in a Waring-type blender set at the lowest speed. The fluid's density and Brookfield viscosities were determined. The data obtained are set forth in Table A. The concentration of aphrons in the fluid was estimated from the density reduction using the equation:

% aphrons=[(Calculated Density)−(Measured Density)](100)

(Calculated Density)

EXAMPLE 2

A fluid as set forth in Daigle U.S. Pat. No. 3,953,336 was prepared containing 2 ppb HEC-10™ hydroxyethylcellulose, 2.0 ppb XCD™ xanthan gum, and 0.2 ppb caustic soda. 0.5 ppb BLUE-STREAK aphron-generating surfactant was added and the fluid processed and evaluated as in Example 1. The data obtained are set forth in Table A.

TABLE A

| | Brookfield Viscosity, cp | | | Density | Aphrons |
|---|---|---|---|---|---|
| Example | 0.5 rpm | 100 rpm | STI | ppg | Vol. % |
| 1 | 98,000 | 1120 | 87 | 7.01 | 16.0 |
| 2 | 61,000 | 1460 | 42 | 6.68 | 19.8 |
| 3 | 256,000 | 4800 | 53 | 7.4 | 11.2 |
| 4 | 168,000 | 4440 | 38 | 6.9 | 17.2 |

EXAMPLE 3

In 350 ml of fresh water were hydrated 3.0 g (3.0 ppb) of sodium alginate. Thereafter 1.0 g of a 30% by weight solution of calcium chloride was added to crosslink the polymer, followed by 0.5 g (0.5 ppb) of BLUE STREAK™ aphron-generating surfactant. The fluid was evaluated as in Example 1. The data are set forth in Table A.

EXAMPLE 4

An additional 0.5 g (0.5 ppb) of BLUE STREAK™ aphron-generating surfactant was added to the fluid of Example 3 and similarly evaluated. The data obtained are set forth in Table A.

What is claimed is:

1. A well drilling and servicing fluid which can be continuously recirculated in a borehole comprising an aqueous liquid having incorporated therein one or more viscosifiers such that the fluid has a low shear rate viscosity as measured with a Brookfield Viscometer at 0.5 rpm of at least 20,000 centipoise, an aphron-generating surfactant in an amount insufficient to create a long lasting foam on the surface of the fluid, and aphrons wherein the concentration of aphrons is less than about 20% by volume of the fluid at atmospheric pressure.

2. The fluid of claim 1 wherein the concentration of aphrons in the fluid is calculated from the density reduction of the fluid which occurs on generation of the aphrons.

3. The fluid of claim 1 wherein the low shear rate viscosity is at least about 40,000 centipoise.

4. The fluid of claim 2 wherein the low shear rate viscosity is at least about 40,000 centipoise.

5. The fluid of claim 1 wherein the viscosifier is (1) an alginate polymer selected from the group consistbg of sodium alginate, sodium calcium alginate, ammoniurn calcium alginate, ammonium alginate, potassium alginate, propyleneglycol alginate, and mixtures thereof; or (2) mixtures of xanthan gum and a cellulose derivative wherein the weight ratio of xanthan gum to cellulose derivative is in the range from about 80:20 to about 20:80, and wherein the cellulose derivative is selected from he group consisting of hydroxyethylcellulose, hydroxpropylcellulose, carboxymethylcellulose and mixtures thereof; or (3) a biopolymer produced by the action of bacteria, fungi, or other microorganisms on a suitable substrate; or (4) mixtures of a bentonitic clay and an additive comprising (a) a nonionic, water-soluble polysaccharide selected from the group consisting of (i) a non-ionic, water-soluble cellulosic derivative, and (ii) a non-ionic water-soluble derivative; or (b) an anionic water-soluble polysaccharide selected from the group consisting of (i) a carboxymethyl cellulose, and (ii) Xanthomonas campestris polysaccharide; or (c) a combination thereof; and (d) an intermediate molecular weight polyglycol, selected from the group consisting of polyethylene glycol, polypropylene glycol, and poly-(alkanediol), having an average molecular weight of from about 600 to about 30,000, said polyglycol being used in an amount effective to provide compatibility in the drilling fluid between the clay and the polysaccharide; or (5) compatible mixtures thereof wherein the components of the mixtures may be added individually to the fluid to the effect enhancement of the low shear rate viscosity thereof.

6. The process of drilling a wellbore into a subterranean formation wherein a drilling fluid is continuously recirculated in the wellbore while drilling proceeds which comprises utilizing as the drilling fluid the fluid of claim 1.

7. The process of conducting well servicing operations within a wellbore wherein the well servicing fluid is the fluid of claim 1.

8. The process of drilling a wellbore into a subterranean formation wherein a drilling fluid is continuously recirculated in the wellbore while drilling proceeds which comprises utilizing as the drilling fluid the fluid of claim 5.

9. The process of conducting well servicing operations-within a wellbore wherein the well servicing fluid is the fluid of claim 5.

10. The process of claim 7 wherein the well servicing operation is selected from the group consisting of completion operations, workover operations, sand control operations, and frac pack operations.

11. The process of claim 9 wherein the well servicing operation is selected from the group consisting of completion operations, workover operations, sand control operations, and frac pack operations.

12. A well drilling and servicing fluid comprising a continuously recirculatable aqueous liquid having incorporated therein one or more viscosifiers such that the fluid has a low shear rate viscosity as measured with a Brookfield Viscometer at 0.5 rpm of at least 20,000 centipoise, an aphron-generating surfactant in an amount insufficient to create a long lasting foam on the surface of the fluid, and aphrons wherein the concentration of aphrons is less than about 15% by volume of the fluid at atmospheric pressure.

13. The fluid of claim 12 wherein the concentration of aphrons in the fluid is calculated from the density reduction of the fluid which occurs on generation of the aphrons.

14. The fluid of claim 12 wherein the low shear rate viscosity is at least about 40,000 centipoise.

15. The fluid of claim 13 wherein the low shear rate viscosity is at least about 40,000 centipoise.

16. The fluid of claim 12 wherein the viscosifier is (1) an alginate polymer selected from the group consisting of sodium alginate, sodium calcium alginate, ammonium calcium alginate, ammonium alginate, potassium alginate, propyleneglycol alginate, and mixtures thereof; or (2) mixtures of xanthan gum and a cellulose derivative wherein the weight ratio of xanthan gum to cellulose derivative is in the range from about 80:20 to about 20:80, and wherein the cellulose derivative is selected from the group consisting of hydroxyethylcellulose, hydroxpropylcellulose carboxymethylcellulose, and mixtures thereof; or (3) a biopolymer produced by the action of bacteria, fungi, or other microorganisms on a suitable substrate; or (4) mixtures of a bentonitic clay and an additive comprising (a) a nonionic, water-soluble polysaccharide selected from the group consisting of (i) a non-ionic, water-soluble cellulosic derivative, and (ii) a non-ionic water-soluble derivative; or (1,) an anionic water-soluble polysaccharide selected from the group consisting of (i) a carboxymethyl cellulose, and (ii) Xanthomonas campestris polysaccharide; or (c) a combination thereof; and (ii) an intermediate molecular weight polyglycol, selected from the group consisting of polyethylene glycol, polypropylene glycol, and poly-(alkanediol), having an average molecular weight of from about 600 to about 30,000, said polyglycol being used in an amount effective to provide compatibility in the drilling fluid between the clay and the polysaccharide; or (5) compatible mixtures thereof; wherein the components of the mixtures may be added individually to the fluid to the effect enhancement of the low shear rate viscosity thereof.

17. The process of drilling a wellbore into a subterranean formation wherein a drilling fluid is continuously recirculated in the wellbore while drilling proceeds which comprises utilizing as the drilling fluid the fluid of claim 12.

18. The process of conducting well servicing operations within a wellbore wherein the well servicing fluid is the fluid of claim 12.

19. The process of drilling a wellbore into a subterranean formation wherein a drilling fluid is continuously recirculated in the wellbore while drilling proceeds which comprises utilizing as the drilling fluid the fluid of claim 16.

20. The process of conducting well servicing operations within a wellbore wherein the well servicing fluid is the fluid of claim 16.

21. The process of claim 18 wherein the well servicing operation is selected from the group consisting of completion operations, workover operations, sand control operations, and frac pack operations.

22. The process of claim 20 wherein the well servicing operation is selected from the group consisting of completion operations, workover operations, sand control operations, and frac pack operations.

23. The fluid of claim 1 wherein the viscosifier is a biopolymer produced by the action of bacteria, fungi, or other microorganisms on a suitable substrate.

24. The process of claim 6 wherein the viscosifier is a biopolymer produced by the action of bacteria, fungi, or other microorganisms on a suitable substrate.

25. The fluid of claim 12 wherein the viscosifier is a biopolymer produced by the action of bacteria, fungi, or other microorganisms on a suitable substrate.

26. The process of claim 17 wherein the viscosifier is a biopolymer produced by the action of bacteria, fungi, or other microorganisms on a suitable substrate.

27. A drilling fluid, comprising:
    an aqueous liquid;
    one or more viscosifiers such that the low shear rate viscosity of the fluid as measured with a Brookfield Viscometer at 0.5 rpm is at least 20,000 centipoise;
    a surfactant; and
    aphrons.

28. The drilling fluid according to claim 27 wherein the low shear rate viscosity is at least 40,000 centipoise.

29. The drilling fluid according to claim 27 or 28 wherein the aphrons comprise less than about 20% by volume of the fluid.

30. The drilling fluid according to claim 27 or 28 wherein the aphrons comprise less than about 15% by volume of the fluid.

31. The drilling fluid according to claim 27 or 28 wherein the aphrons comprise less than about 11% volume of the fluid.

32. The drilling fluid according to claim 27 or 28 wherein the fluid can be continuously recirculated.

33. The drilling fluid of claim 27 or 28 wherein said one or more viscosifiers comprises an alginate polymer.

34. The drilling fluid of claim 33 wherein the alginate polymer is selected from the group consisting of sodium alginate, sodium calcium alginate, ammonium calcium alginate, ammonium alginate, potassium alginate, propyleneglycol alginate, and mixtures thereof.

35. The drilling fluid of claim 27 or 28 wherein said one or more viscosifiers comprises a mixture of xanthan gum and a cellulose derivative.

36. The drilling fluid of claim 35 wherein the weight ratio of xanthan gum to cellulose derivative is in the range from about 80:20 to about 20:80, and wherein the cellulose derivative is selected from the group consisting of hydroxyethylcellulose, hydroxpropylcellulose, carboxymethylcellulose, and mixtures thereof.

37. The drilling fluid of claim 27 or 28 wherein said one or more viscosifiers comprises a biopolymer.

38. The drilling fluid of claim 37 wherein the biopolymer is produced by the action of bacteria, fungi, or other microorganisms on a suitable substrate.

39. The drilling fluid of claim 27 or 28 wherein said one or more viscosifiers comprises a mixture of a bentonitic clay and an additive comprising:
  (a) a nonionic, water-soluble polysaccharide selected from the group consisting of
      (i) a non-ionic, water-soluble cellulosic derivative; and
      (ii) a non-ionic water-soluble guar derivative; or
  (b) an anionic water-soluble polysaccharide selected from the group consisting of;
      (i) a carboxymethyl cellulose; and
      (ii) Xanthomonas campestris polysaccharide;.or
  (c) a combination thereof; and
  (d) an intermediate molecular weight polyglycol, selected from the group consisting of polyethylene glycol, polypropylene glycol, and poly-(alkanediol), having an average molecular weight of from about 600 to about 30,000, said polyglycol being used in an amount effective to provide compatibility mixtures thereof; wherein the components of the mixtures may be added individually to the fluid to effect enhancement of the low shear rate viscosity thereof.

40. A servicing fluid, comprising:
an aqueous liquid;
one or more viscosifiers such that the low shear rate viscosity of the fluid as measured with a Brookfield viscometer at 0.5 rpm is at least 20,000 centipoise;
a surfactant; and 41. The servicing fluid according to claim 40 wherein the low shear rate viscosity is at least 40,000 centipoise.

42. The servicing fluid according to claim 40 or 41 wherein the aphrons comprise less than about 20% by volume of the fluid.

43. The servicing fluid according to claim 40 or 41 wherein the aphrons comprise less than about 15% by volume of the fluid.

44. The servicing fluid according to claim 40 or 41 wherein the aphrons comprise less than about 11% by volume of the fluid.

45. The servicing fluid according to claim 40 or 41 wherein the fluid can be continuously recirculated.

46. The servicing fluid of claim 40 or 41 wherein said one or more viscosifiers comprises all alginate polymer.

47. The servicing fluid of claim 46 wherein the alginate polymer is selected from the group consisting of sodium alginate, sodium calcium alginate, ammonium calcium alginate, ammonium alginate, potassium alginate, propyleneglycol alginate, and mixtures thereof.

48. The servicing fluid of claim 40 or 41 wherein said one or more viscosifiers comprises a mixture of xanthan gum and a cellulose derivative.

49. The servicing fluid of claim 48 wherein the weight ratio of xanthan gum to cellulose derivative is in the range from about 80:20 to about 20:80, and wherein the cellulose derivative is selected from the group consisting of hydroxyethylcellulose, hydroxpropylcellulose, carboxymethylcellulose, and mixtures thereof.

50. The servicing fluid of claim 40 or 41 wherein said one or more viscosifiers comprises a biopolymer.

51. The servicing fluid of claim 50 wherein the biopolymer is produced by the action of bacteria, fungi, or other microorganisms on a suitable substrate.

52. The servicing fluid of claim 40 or 41 wherein the viscosifier is a mixture of a bentonitic clay and an additive comprising:
(a) a nonionic, water-soluble polysaccharide selected from the group consisting of
  (i) a non-ionic, water-soluble cellulosic derivative; and
  (ii) a non-ionic water-soluble guar derivative; or
(b) an anionic water-soluble polysaccharide selected from the group consisting of;
  (i) a carboxymethyl cellulose; and
  (ii) Xanthomonas campestris polysaccharide; or
(c) a combination thereof; and
(d) an intermediate molecular weight polyglycol, selected from the group consisting of polyethylene glycol, polypropylene glycol, and poly-{alkanediol), having an average molecular weight or from about 600 to about 30,000, said polyglycol being used in an amount effective to provide compatibility mixtures thereof; wherein the components of the mixtures may be added individually to the fluid to effect enhancement of the low shear rate viscosity thereof.

53. A process for drilling or servicing a wellbore in a subterranean formation wherein a drilling or servicing fluid is circulated in the wellbore, comprising:
utilizing as the drilling or servicing fluid an aqueous liquid having dispersed therein at least one water soluble surfactant, one or more viscosifiers such that the low shear rate viscosity of the fluid as measured by a Brookfield viscometer at 0.5 rpm is at least 20,000 centipoise, wherein the drilling fluid includes aphrons.

54. The process according to claim 53 wherein the low shear rate viscosity is at least 40,000 centipoise.

55. The process according to claim 53 or 54 wherein the aphrons comprise less than about 20% by volume of the fluid.

56. The process according to claim 53 or 54 wherein the aphrons comprise less than about 15% by volume of the fluid.

57. The process according to claim 53 or 54 wherein the aphrons comprise less than about 11% by volume of the fluid.

58. The process according to claim 53 or 54 wherein the fluid can be continuously recirculated.

59. The process according to claim 53 or 54 wherein said one or more viscosifiers comprises an alginate polymer.

60. The process according to claim 59 wherein the alginate polymer is selected from the group consisting of sodium alginate, sodium calcium alginate, ammonium calcium alginate, ammonium alginate, potassium alginate, propyleneglycol alginate, and mixtures thereof.

61. The process according to claim 53 or 54 wherein said one or more viscosifiers comprises a mixture of xanthan gum and a cellulose derivative.

62. The process according to claim 61 wherein the weight ratio of xanthan gum to cellulose derivative is in the range from about 80:20 to about 20:80, and wherein the cellulose derivative is selected from the group consisting of hydroxyethylcellulose, hydroxpropylcellulose, carboxymethylcellulose, and mixtures thereof.

63. The process according to claim 53 or 54 wherein said one or more viscosifiers comprises a biopolymer produced by the action of bacteria, fungi, or other microorganisms on a suitable substrate.

64. The process according to claim 53 or 54 wherein the viscosifier is a mixture of a bentonitic clay and an additive comprising:
(a) a nonionic, water-soluble polysaccharide selected from the group consisting of;
  (i) a non-ionic, water-soluble cellulosic derivative, and
  (ii) a non-ionic water-soluble gu& derivative; or
(b) an anionic water-soluble polysaccharide selected from the group consisting of;
  (i) a carboxymethyl cellulose; and
  (ii) Xanthomonas campestris polysaccharide; or
(c) a combination thereof; and
(d) an intermediate molecular weight polyglycol, selected from the group consisting of polyethylene glycol, polypropylene glycol, and poly-(alkanediol), having an average molecular weight of from about 600 to about 30,000, said polyglycol being used in an amount effective to provide compatibility mixtures thereof; wherein the components of the mixtures may be added individually to the fluid to effect enhancement of the low shear rate viscosity thereof.

65. A drilling fluid, comprising:
an aqueous liquid;
a surfactant;
aphrons; and one or more viscosifiers such that the low shear rate viscosity of the fluid as measured with a Brookfield Viscometer at 0.5 rpm is at least 20,000 centipoise, said one or more viscosifiers selected from the group consisting of:

alginate polymer;
(1) a mixture of xanthan pm and a cellulose derivative;
(2) a mixture of bentonitic clay and an additive comprising:
  (a) a nonionic, water-soluble polysaccharide selected from the group consisting of;
    (i) a non-ionic, water-soluble cellulosic derivative, and
    (ii) a non-ionic water-soluble guar derivative; or
  (b) an anionic water-soluble polysaccharide selected from the group consisting of;
    (i) a carboxymethyl cellulose; and
    (ii) Xanthomonas campestris polysaccharide; or
  (c) a combination thereof; and
  (d) an intermediate molecular weight polyglycol, selected from the group consisting of polyethylene glycol, polypropylene glycol, and poly-(alkanediol, having an average molecular weight of from about 600 to about 30,000, said polyglycol being used in an amount effective to provide compatibility mixtures thereof; wherein the components of the mixtures may be added individually to the fluid to effect enhancement of the low shear rate viscosity thereof; and
(3) mixtures thereof.

66. The drilling fluid of claim 65 wherein the alginate polymer is selected from the group consisting of sodium alginate, sodium calcium alginate, ammonium calcium alginate, ammonium alginate, potassium alginate, propyleneglycol alginate, and mixtures thereof.

67. The drilling fluid of claim 65 wherein the weight ratio of xanthan gum to cellulose derivative is in the range from about 80:20 to about 20:80, and wherein the cellulose derivative is selected from the group consisting of hydroxyethylcellulose, hydroxpropylcellulose, carboxymethyl-cellulose, and mixtures thereof.

68. A servicing fluid, comprising:
an aqueous liquid;
a surfactant;
aphrons; and
one or more viscosifiers such that the low shear rate viscosity of the fluid as measured with a Brookfield Viscometer at 0.5 rpm is at least 20,000 centipoise, said one or more viscosifiers selected from the group consisting of:
(1) alginate polymer;
(2) a mixture of xanthan gum and a cellulose derivative;
(3) a mixture of bentonitic clay and an additive comprising:
  (a) a nonionic, water-soluble polysaccharide selected from the group consisting of;
    (i) a non-tonic, water-soluble cellulosic derivative, and
    (ii) a non-ionic water-soluble guar derivative; or
  (b) an anionic water-soluble polysaccharide selected from the group consisting of;
    (i) a carboxymethyl cellulose; and
    (ii) Xanthomonas campestris polysaccharide or
  (c) a combination thereof; and
  (d) an intermediate molecular weight polyglycol, secreted from the group consisting of polyethylene glycol, polypropylene glycol, and poly-(alkanediol), having an average molecular weight of from about 600 to about 30,000, said polyglycol being used in an amount effective to provide compatibility mixtures thereof; wherein the components of the mixtures may be added individually to the fluid to effect enhancement of the low shear rate viscosity thereof; and
(4) mixtures thereof.

69. The servicing fluid of claim 68 wherein the alginate polymer is selected from the group consisting of sodium alginate, sodium calcium alginate, ammonium calcium alginate, ammonium alginate, potassium alginate, propyleneglycol alginate, and mixtures thereof.

70. The servicing fluid of claim 68 wherein the weight ratio of xanthan gum to cellulose derivative is in the range from about 80:20 to about 20:80, and wherein the cellulose derivative is selected from the group consisting of hydroxyethylcellulose, hydroxypropylcellulose, carboxymethyl-cellulose, and mixtures thereof.

71. The drilling fluid of claim 27 wherein said one or more viscosifiers comprises a bentonitic clay.

72. The drilling fluid of claim 27 wherein said one or more viscosifiers comprises a bentonitic clay and an additive.

73. The drilling fluid of claim 72 wherein the additive comprises a mixed metal hydroxide.

74. The drilling fluid of claim 27 wherein the low shear rate viscosity is obtained by flocculating bentonitic clay.

75. The drilling fluid of claim 27 wherein the aphrons prevent loss of excess drilling fluid into the formation.

76. The drilling fluid of claim 27 wherein the aphrons effectively seal the formation.

77. The drilling fluid according to claim 27 wherein the low shear rate viscosity is at least 98,000 centipoise.

78. The servicing fluid of claim 40 wherein said one or more viscosifiers comprises a bentonitic clay.

79. The servicing fluid of claim 40 wherein said one or more viscosifiers comprises a bentonitic clay and an additive.

80. The servicing fluid of claim 79 wherein the additive comprises a mixed metal hydroxide.

81. The servicing fluid of claim 40 wherein the low shear rate viscosity is obtained by flocculating bentonitic clay.

82. The servicing fluid of claim 40 wherein the aphrons prevent loss of excess servicing fluid into the formation.

83. The servicing fluid of claim 40 wherein the aphrons effectively seal the formation.

84. The servicing fluid according to claim 40 wherein the low shear rate viscosity is at least 98,000 centipoise.

85. The process of claim 53 wherein said one or more viscosifiers comprises a bentonitic clay.

86. The process of claim 53 wherein said one or more viscosifiers comprises a bentonitic clay and an additive.

87. The process of claim 86 wherein the additive comprises a mixed metal hydroxide.

88. The process of claim 53 wherein the low shear rate viscosity is obtained by flocculating bentonitic clay.

89. The process of claim 53 wherein the aphrons prevent loss of excess drilling or servicing fluid into the formation.

90. The process of claim 53 wherein the aphrons effectively seal the formation.

91. The process according to claim 53 wherein the low shear rate viscosity is at least 98,000 centipoise.

92. The drilling fluid of claim 27 wherein the low shear rate viscosity is at least 168,000 centipoise.

93. The servicing fluid of claim 40 wherein the low shear rate viscosity is at least 168,000 centipoise.

94. The process of claim 53 wherein the low shear rate viscosity is at least 168,000 centipoise.

* * * * *

UNITED STATES PATENT AND TRADEMARK OFFICE
CERTIFICATE OF CORRECTION

| | | |
|---|---|---|
| PATENT NO. | : 6,770,601 B1 | Page 1 of 6 |
| APPLICATION NO. | : 09/246932 | |
| DATED | : August 3, 2004 | |
| INVENTOR(S) | : Tommy F. Brookey | |

It is certified that error appears in the above-identified patent and that said Letters Patent is hereby corrected as shown below:

Claim 5. The fluid of Claim 1 wherein the viscosifier is (1) an alginate polymer selected from the group ~~consistbg~~ consisting of sodium alginate, sodium calcium alginate, ammonium calcium alginate, ammonium alginate, potassium alginate, propyleneglycol alginate, and mixtures thereof; or (2) mixtures of xanthan gum and a cellulose derivative wherein the weight ratio of xanthan gum to cellulose derivative is in the range from about 80:20 to about 20:80, and wherein the cellulose derivative is selected from ~~he~~ the group consisting of hydroxyethylcellulose, ~~hydroxpropylcellulose~~ hydroxypropylcellulose, carboxymethylcellulose, and mixtures thereof; or (3) a biopolymer produced by the action of bacteria, fungi, or other microorganisms on a suitable substrate; or (4) mixtures of a bentonitic clay and an additive comprising (a) a nonionic, water-soluble polysaccharide selected from the group consisting of (i) a non-ionic, water-soluble cellulosic derivative, and (ii) a non-ionic water-soluble guar derivative; or (b) an anionic water-soluble polysaccharide selected from the group consisting of (i) a carboxymethyl cellulose, and (ii) Xanthomonas campestris polysaccharide; or (c) a combination thereof; and (d) an intermediate molecular weight polyglycol, selected from the group consisting of polyethylene glycol, polypropylene glycol, and poly-(alkanediol), having an average molecular weight of from about 600 to about 30,000, said polyglycol being used in an amount effective to provide compatibility in the drilling fluid between the clay and the polysaccharide; or (5) compatible mixtures thereof; wherein the components of the mixtures may be added individually to the fluid to [[the]] effect enhancement of the low shear rate viscosity thereof.

UNITED STATES PATENT AND TRADEMARK OFFICE
CERTIFICATE OF CORRECTION

PATENT NO. : 6,770,601 B1
APPLICATION NO. : 09/246932
DATED : August 3, 2004
INVENTOR(S) : Tommy F. Brookey It is certified that error appears in the above-identified patent and that said Letters Patent is hereby corrected as shown below:

Claim 16: The fluid of Claim 12 wherein the viscosifier is (1) an alginate polymer selected from the group consisting of sodium alginate, sodium calcium alginate, ammonium calcium alginate, ammonium alginate, potassium alginate, propyleneglycol alginate, and mixtures thereof; or (2) mixtures of xanthan gum and a cellulose derivative wherein the weight ratio of xanthan gum to cellulose derivative is in the range from about 80:20 to about 20:80, and wherein the cellulose derivative is selected from the group consisting of hydroxyethylcellulose, ~~hydroxpropylcellulose~~ hydroxypropylcellulose, carboxymethylcellulose, and mixtures thereof; or (3) a biopolymer produced by the action of bacteria, fungi, or other microorganisms on a suitable substrate; or (4) mixtures of a bentonitic clay and an additive comprising (a) a nonionic, water-soluble polysaccharide selected from the group consisting of (i) a non-ionic, water-soluble cellulosic derivative, (ii) a non-ionic water-soluble derivative; or (~~1~~ b) an anionic water-soluble polysaccharide selected from the group consisting of (i) a carboxymethyl cellulose and (ii) Xanthomonas campestris polysaccharide; or (c) a combination thereof; and (~~ii~~ d) an intermediate molecular weight polyglycol, selected from the group consisting of polyethylene glycol, polypropylene glycol, and poly-(alkanediol), having an average molecular weight of from about 600 to about 30,000, said polyglycol being used in an amount effective to provide compatibility in the drilling fluid between the clay and the polysaccharide; or (5) compatible mixtures thereof; wherein the components of the mixtures may be added individually to the fluid to the effect enhancement of the low shear rate viscosity thereof.

Claim 36: The drilling fluid of claim 35 wherein the weight ratio of xanthan gum to cellulose derivative is in the range from about 80:20 to about 20:80, and wherein the cellulose derivative is selected from the group consisting of hydroxyethylcellulose, ~~hydroxpropylcellulose~~ hydroxypropylcellulose, carboxymethylcellulose, and mixtures thereof.

Claim 40: A servicing fluid, comprising:
an aqueous liquid;
one or more viscosifiers such that the low shear rate viscosity of the fluid as measured with a Brookfield viscometer at 0.5 rpm is at least 20,000 centipoise;
a surfactant; and
aphrons.

Claim 46: The servicing fluid of claim 40 or 41 wherein said one or more viscosifiers comprises [[all]] an alginate polymer

UNITED STATES PATENT AND TRADEMARK OFFICE
CERTIFICATE OF CORRECTION

PATENT NO.       : 6,770,601 B1
APPLICATION NO.  : 09/246932
DATED            : August 3, 2004
INVENTOR(S)      : Tommy F. Brookey It is certified that error appears in the above-identified patent and that said Letters Patent is hereby corrected as shown below:

Claim 49: The servicing fluid of claim 48 wherein the weight ratio of xanthan gum to cellulose derivative is in the range from about 80:20 to about 20:80, and wherein the cellulose derivative is selected from the group consisting of hydroxyethylcellulose, ~~hydroxpropylcellulose~~ hydroxypropylcellulose, carboxymethylcellulose, and mixtures thereof.

Claim 52: The servicing fluid of claim 44 or 45 wherein the viscosifier is a mixture of a bentonitic clay and an additive comprising:
    (a) a nonionic, water-soluble polysaccharide selected from the group consisting of
        (i) a non-ionic, water-soluble cellulosic derivative; and
        (ii) a non-ionic water-soluble guar derivative; or
    (b) an anionic water-soluble polysaccharide selected from the group consisting of;
        (i) a carboxymethyl cellulose; and
        (ii) Xanthomonas campestris polysaccharide; or
    (c) a combination thereof; and
    (d) an intermediate molecular weight polyglycol, selected from the group consisting of polyethylene glycol, polypropylene glycol, and poly-[[{]] (alkanediol), having an average molecular weight ~~or~~ of from about 600 to about 30,000, said polyglycol being used in an amount effective to provide compatibility mixtures thereof; wherein the components of the mixtures may be added individually to the fluid to effect enhancement of the low shear rate viscosity thereof.

Claim 62: The process according to claim 61 wherein the weight ratio of xanthan gum to cellulose derivative is in the range from about 80:20 to about 20:80, and wherein the cellulose derivative is selected from the group consisting of hydroxyethylcellulose, ~~hydroxpropylcellulose~~ hydroxypropylcellulose, carboxymethylcellulose, and mixtures thereof.

UNITED STATES PATENT AND TRADEMARK OFFICE
CERTIFICATE OF CORRECTION

| | | |
|---|---|---|
| PATENT NO. | : 6,770,601 B1 | |
| APPLICATION NO. | : 09/246932 | |
| DATED | : August 3, 2004 | |
| INVENTOR(S) | : Tommy F. Brookey | |

It is certified that error appears in the above-identified patent and that said Letters Patent is hereby corrected as shown below:

Claim 64: The process according to claim 53 or 54 wherein the viscosifier is a mixture of a bentonitic clay and an additive comprising:
    (a) a nonionic, water-soluble polysaccharide selected from the group consisting of;
        (i) a non-ionic, water-soluble cellulosic derivative, and
        (ii) a non-ionic water-soluble [[gu&]] guar derivative; or
    (b) an anionic water-soluble polysaccharide selected from the group consisting of;
        (i) a carboxymethyl cellulose; and
        (ii) Xanthomonas campestris polysaccharide; or
    (c) a combination thereof; and
    (d) an intermediate molecular weight polyglycol, selected from the group consisting of polyethylene glycol, polypropylene glycol, and poly-(alkanediol), having an average molecular weight of from about 600 to about 30,000, said polyglycol being used in an amount effective to provide compatibility mixtures thereof; wherein the components of the mixtures may be added individually to the fluid to effect enhancement of the low shear rate viscosity thereof.

UNITED STATES PATENT AND TRADEMARK OFFICE
CERTIFICATE OF CORRECTION

| | |
|---|---|
| PATENT NO. | : 6,770,601 B1 |
| APPLICATION NO. | : 09/246932 |
| DATED | : August 3, 2004 |
| INVENTOR(S) | : Tommy F. Brookey |

It is certified that error appears in the above-identified patent and that said Letters Patent is hereby corrected as shown below:

Claim 65: A drilling fluid comprising:
    an aqueous liquid;
    a surfactant;
    aphrons; and
    one or more viscosifiers such that the low shear rates viscosity of the fluid as measured with a Brookfield Viscometer at 0.5 rpm is at least 20,000 centipoise, said one or more viscosifiers selected from the group consisting of:
    alginate polymer;
    (1) a mixture of xanthan [[pm]] gum and a cellulose derivative;
    (2) a mixture of bentonitic clay and an additive comprising:
        (a) a nonionic, water-soluble polysaccharide selected from the group consisting of;
            (i) a non-ionic, water-soluble cellulosic derivative, and
            (ii) a non-ionic water-soluble guar derivative; or
        (b) an anionic water-soluble polysaccharide selected from the group consisting of;
            (i) a carboxymethyl cellulose; and
            (ii) Xanthomonas campestris polysaccharide; or
        (c) a combination thereof; and
        (d) an intermediate molecular weight polyglycol, selected from the group consisting of polyethylene glycol, polypropylene glycol, and poly-(alkanediol), having an average molecular weight of from about 600 to about 30,000, said polyglycol being used in an amount effective to provide compatibility mixtures thereof; wherein the components of the mixtures may be added individually to the fluid to effect enhancement of the low shear rate viscosity thereof; and
    (3) mixtures thereof.

Claim 67: The drilling fluid of claim 65 wherein the weight ratio of xanthan gum to cellulose derivative is in the range from about 80:20 to about 20:80, and wherein the cellulose derivative is selected from the group consisting of hydroxyethylcellulose, ~~hydroxproplycellulose~~ hydroxypropylcellulose, carboxymethyl-cellulose, and mixtures thereof.

UNITED STATES PATENT AND TRADEMARK OFFICE
CERTIFICATE OF CORRECTION

PATENT NO.       : 6,770,601 B1
APPLICATION NO.  : 09/246932
DATED            : August 3, 2004
INVENTOR(S)      : Tommy F. Brookey It is certified that error appears in the above-identified patent and that said Letters Patent is hereby corrected as shown below:

Claim 70: The servicing fluid of claim 68 wherein the weight ratio of xanthan gum to cellulose derivative is in the range from about 80:20 to about 20:80, and wherein the cellulose derivative is selected from the group consisting of hydroxyethylcellulose, hydroxypropylcellulose, ~~carboxmethyl-cellulose~~ carboxymethyl-cellulose, and mixtures thereof.

Signed and Sealed this

Third Day of October, 2006

JON W. DUDAS
*Director of the United States Patent and Trademark Office*